Dec. 21, 1965   H. S. DAVIS   3,224,458
SEQUENCING VALVE
Original Filed Nov. 2, 1962   2 Sheets-Sheet 1
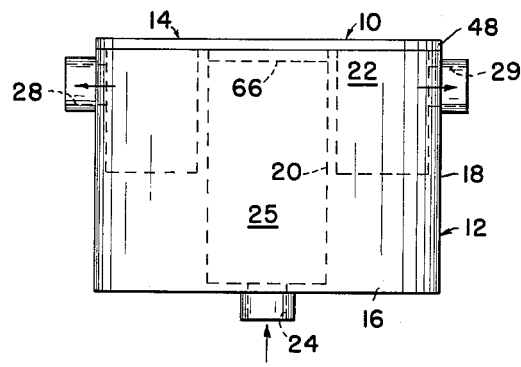
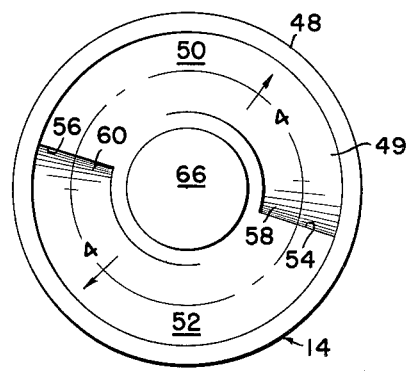
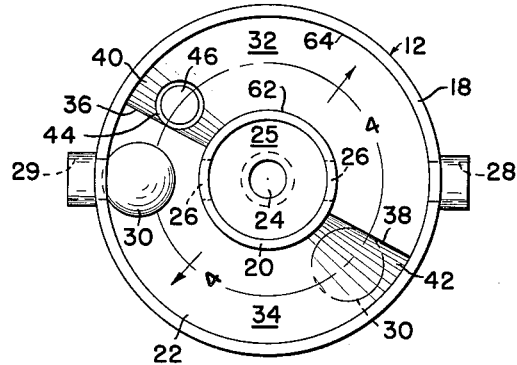
INVENTOR.
HARRY S. DAVIS
BY
Raymond W Lotten
ATTORNEY

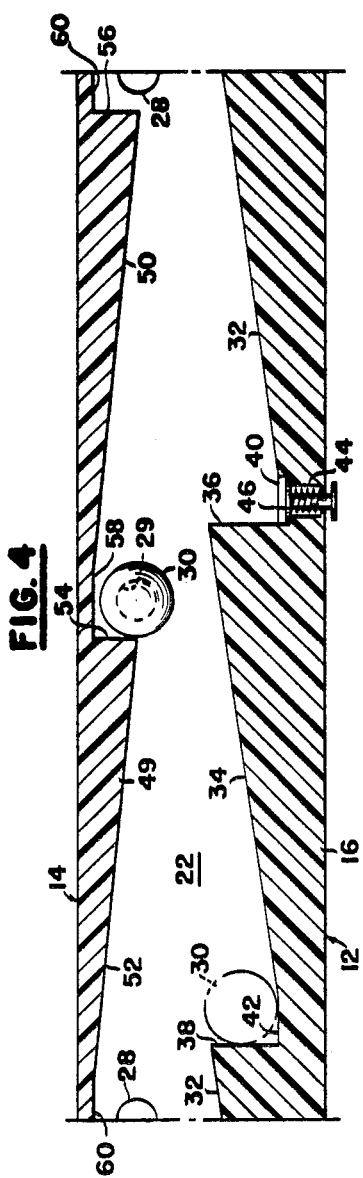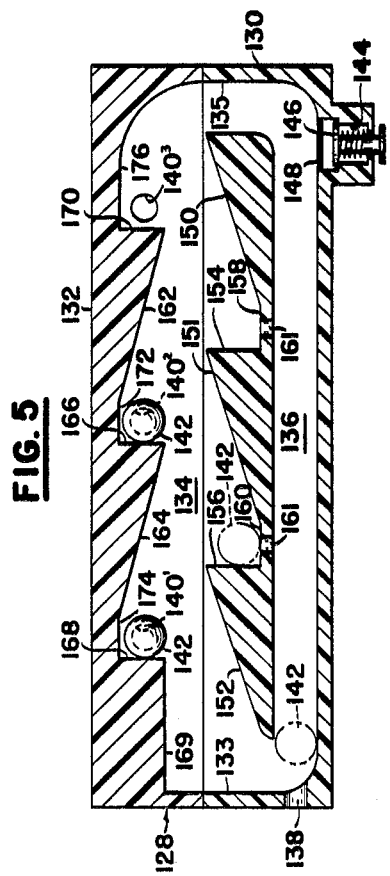

United States Patent Office 3,224,458
Patented Dec. 21, 1965

3,224,458
SEQUENCING VALVE
Harry S. Davis, Fort Lauderdale, Fla., assignor to Davis Flow Valve, Inc., Fort Lauderdale, Fla., a corporation of Florida
Original application Nov. 2, 1962, Ser. No. 239,226. Divided and this application July 22, 1964, Ser. No. 384,402
12 Claims. (Cl. 137—119)

This application is a division of application Serial Number 239,226 filed November 2, 1962, which latter application, in turn, is a continuation-in-part of an application entitled, Davis Flow Valve, Serial Number 206,556 filed June 28, 1962, now abandoned.

This invention relates to valves, and more specifically to a sequencing valve operable to selectively deliver a fluid under pressure from a source to one or more discharge or distribution lines at predetermined intervals.

While not limited thereto, this invention finds especial application in irrigation systems, wherein water from a supply, such as from a reservoir, well, or city main, is delivered in sequence to a number of distribution lines which may have sprinkler or spray heads and the like. Such systems usually include at least one sequencing valve which is operable to deliver water to the several distribution lines, one at a time, at desired intervals in a predetermined sequence. The sequencing valve or valves may be manually actuated, but are frequently actuated by a timing mechanism which controls the time that the sequencing operation begins and also controls the sequencing intervals. Heretofore such systems included a valve in each distribution line which is opened and closed, hydraulically and/or electrically, by the timing mechanism, or a single rotary valve was provided to control a plurality of distribution lines to sequentially deliver water to one or more lines. Such known systems require a number of valves, or a single valve having a number of moving parts, and are costly to install and frequently require expensive servicing.

It is an object of this invention to provide a novel sequencing valve which is economical to manufacture and which is fool proof in operation.

It is a further object to provide a novel sequencing valve which is operable, in response to the supply of fluid to the valve and to the cessation of supply thereto, to sequentially supply fluid to the several distribution lines.

It is a still further object to provide a novel sequencing system having, as the only moving parts, one or more freely movable valve elements, at least one less than the number of outlets, which are movable by the flow of fluid when said fluid is supplied to the valve, to move the valve elements into one position to obstruct flow from one or more outlets and to permit flow through at least one outlet, and which are movable into an intermediate position by gravity, upon cessation of fluid supply to the valve, to open all outlets, and from which intermediate position the valve elements may be subsequently carried by the fluid, when fluid flow is restored, into a different fluid flow controlling position.

It is a still further object to provide a novel sequencing valve having walls of such contour, and a freely movable ball valve element or ball valve elements cooperable with the walls and with the outlets, to sequentially move the valve element or elements, in response to the supply of fluid to the valve and to the cessation of supply thereto, to produce a sequential flow of fluid through at least one outlet.

It is a still further object to provide a sequencing valve having freely movable ball valve elements which have the same density as the fluid being valved so as to be suspended therein, or having a slightly less density than the fluid being valved so as to float thereon, whereby the valve elements are carried by the fluid being valved to a valve outlet closing position in response to flow of fluid through the valve housing, and to a valve outlet upon position in response to the cessation of flow through the valve housing, and whereby the valve elements will sink in a fluid having a less density so that there will be no valving action when such a low density fluid is passed through the valve housing at a relatively slow rate of flow.

The attainment of the above objects, as well as other objects and advantages, will be fully understood from a consideration of the following description and from the accompanying drawings, in which:

FIG. 1 is an elevation view of a first modification of a valve according to the invention;

FIG. 2 is an end view of the top or cover of the valve of FIG. 1, looking upward at the sloping ceiling surface;

FIG. 3 is a plan view of the valve of FIG. 1 with the top or cover removed, looking downward at the sloping floor surface;

FIG. 4 is a developed sectional view of the valve taken along the line 4—4 of FIG. 2; and FIG. 5 is a vertical sectional view through a modification of a valve according to the invention.

In the ensuing description, similar parts in the several figures are designated by the same reference character.

Referring to the modification shown in FIGS. 1, 2, 3 and 4, the sequencing valve, designated in its entirety by the reference numeral 10, comprises a hollow base 12 having a cover 14.

The hollow base 12 comprises an integral bottom section 16, an outer side wall 18, and an inner wall 20. The walls 18 and 20 are concentrically disposed and have the same height, and define, in cooperation with the bottom section 16 and the cover 14, an annular or endless fluid flow passage 22. The interior of the inner wall 20 forms a chamber 25 to which fluid under pressure is admitted through an inlet 24, and from which the fluid is discharged into the flow passage 22 through a pair of opposed ports 26 in the inner wall 20, all of which comprise an inlet means.

The other side wall 18 is provided with a pair of diametrically opposed outlets 28 and 29, under the control of a ball valve element 30.

The bottom wall or floor of the fluid flow passage 22 is formed with a pair of sloping floor surfaces 32 and 34. The surfaces are inclined in the same direction, and are interconnected by a pair of vertical walls 36 and 38 and connecting floor surfaces 40 and 42. One or both of the connecting floor surfaces 40 and 42 contain a bleed port 44 controlled by a normally open check valve 46.

The cover 14 includes a rim 48 and a depending construction 49 forming a pair of sloping ceiling surfaces 50 and 52, inclined in the same direction. The ceiling surfaces 50 and 52 are interconnected by a pair of vertical walls 54 and 56, and a pair of connecting ceiling surfaces 58 and 60. The outlets 28 and 29 are disposed in the upper portion of the fluid flow passage 22 in the niches formed by the vertical walls 54 and 56 and by the connecting ceiling surfaces 58 and 60 at the upper ends of the sloping surfaces 50 and 52.

The depending construction 49 has a radial thickness substantially equal to the radial width of the annular flow passage 22 and projects into the flow passage in contact with the inner and outer surfaces 62 and 64 of the flow passage to form a fluid tight connection. The depending construction 49 also includes a central circular projection 66 extending into the upper end of the chamber 25 forming a closure therefor. The rim 48 is securely fastened or cemented to the upper end of the hollow base 12 to form a unitary and leakproof structure.

The housing may be made of any suitable material, such as plastic or metal, and the ball valve element or elements may be made of any suitable material, such as plastic, metal, or wood.

While, in the illustrative construction shown in the drawings, two outlets and a single ball valve element are disclosed, it is evident that a greater number of outlets may be provided, depending upon the number of distribution lines to be served. If sequential flow of fluid is to be supplied to one distribution line at a time, the number of ball valve elements should be one less than the number of outlets; if sequential flow of fluid is to be supplied to two distribution lines at a time, the number of ball valve elements should be two less than the number of outlets, and so forth.

While a bleed port 44 is shown in only one connecting floor surface, it is evident that a similar bleed port can be provided in more than one connecting floor surface or in all connecting floor surfaces. Instead of inserting a check valve in the bleed ports, normally open bleed ports of small diameter may be provided, permitting a constant, restricted, bleed of fluid from the fluid flow passage 22. The bleed ports must be so disposed in the connecting floor surfaces that the ball valve elements do not interfere with the flow of fluid therethrough.

The sequencing operation of the valve functions as the result of the alternate admission of fluid under pressure and the cessation of fluid supply under pressure to the fluid flow passage. This alternate operation of the fluid supply is usually obtained by a valve or by a pump in the supply line. In the case where the sequencing valve is supplied with fluid under pressure from a tank or reservoir, or from a city main, a valve in the supply line to the sequencing valve is intermittently closed and opened either manually or automatically as by a timing device. If the fluid is supplied under pressure by a pump, sequential operation is obtained by intermittently energizing the motor which drives the pump or by intermittently clutching and unclutching the pump driving connection, or by intermittently loading and unloading the pump, which may be done manually or automatically under the control of a timing device.

The ball valve elements 30 may have the same density as the fluid passing through the fluid flow passage 22 so as to be suspended therein, or may have a slightly less density so as to float on the surface of the fluid.

The operation of the modification shown in FIGS. 1–4 will be described for a system having a valve element or elements as light as, or slightly lighter than, that of the fluid passing through the flow passage 22 so as to suspended therein or to float on the surface thereof.

In FIG. 3, it should be noted that the ports 26 are aligned with the outlets 28 and 29 to direct a jet of water toward the outlets when fluid under pressure is admitted through the inlet passage 24 and chamber 25. While this arrangement is preferred, it should be understood that it is not essential to the operation of the sequencing valve, but that one or more ports may be disposed at other locations in the side wall or floor, offset relative to the outlets, in the upper or lower part of the flow passage, to supply fluid into the flow passage 22 to discharge through the outlets 28 and 29.

FIGS. 3 and 4 illustrate one of the operative positions of the sequencing valve when fluid under pressure is being supplied through the inlet means comprising the inlet passage 24, chamber 25 and ports 26 into the fluid flow passage 22. Ball valve element 30, as shown in full lines, obstructs flow through the outlet 29, being retained on its seat by the pressure of fluid in the flow passage 22. At the same time, fluid under pressure is being discharged through the outlet 28 into the distribution line connected therewith, which may supply water to a series of spaced sprinkler heads or irrigation outlets. Because of the back pressure caused by the open distribution line, the ball valve element 30 is retained on its seat in the outlet 29, and check valve 46 is retained on its seat, against the opening force of its spring, by the fluid pressure in the flow passage 22, preventing the escape of fluid from the bleed port 44. Upon the cessation of fluid supply to the sequencing valve 10, either by the closing of the valve in the supply line or by deenergizing the motor which drives the supply pump, the pressure in the fluid flow passage 22 quickly decreases to a value permitting the spring to open the check valve 46, allowing the rapid escape of fluid from the flow passage 22 through one or more bleed ports 44. As the liquid level drops in the flow passage 22, the ball valve element 30 drops, under the force of gravity, from its position in register with the outlet 29 and floats on the surface of or is suspended in the receding water until the ball valve element engages the upper end of the sloping floor surface 34, and as the liquid level continues to recede, the ball valve element 30 rolls or is cammed down to the bottom of the ramp or sloping surafce 34 to rest on the surface 42 in the position shown in broken lines, in contact with the vertical wall 38, which functions as a stop. Both outlets 28 and 29 are open. When the valve in the fluid supply line is opened, or the pump supplying fluid thereto is energized, the fluid flow passage 22 quickly fills with fluid which flows from both ports 26, through the fluid flow passage 22, filling the flow passage, and discharges through both outlets 28 and 29. Ball valve element 30 is floated on or its suspended in the fluid in the flow passage 22, and as the liquid level continues to rise, the ball valve element engages the sloping ceiling surface 52 which cams the ball valve element toward the outlet 28. The fluid flow through the flow passage 22, in cooperation with the sloping ceiling surface 52, carries the ball valve element toward the niche formed by the wall 56 and surface 60, and into register with the outlet 28, obstructing flow therefrom, the pressure of the fluid in the flow passage 22 retaining the ball valve element on its seat. Meanwhile, fluid under pressure is permitted to discharge through the unobstructed outlet 29, the relation of outflow to inflow, and the resistance to flow offered by the distribution line supplied by the outlet 29, maintaining sufficient pressure in the fluid flow passage 22 to force the normally open check valve or valves 46 against their seats and to retain them closed. This condition obtains until the fluid supply to the inlet 24 is against discontinued, whereupon the check valve 46 opens, in response to decreased pressure in the flow passage 22, to bleed fluid from the flow passage 22, whereby the force of gravity and the drop in liquid level permit the ball valve element 30 to move away from the outlet 28 and to roll or to be cammed down the sloping floor surface 32 to the bottom of the ramp to rest on the surface 40 in contact with the vertical wall or stop 36, in proximity with the outet 29, so that, when fluid is again admitted into the flow passage 22, the ball valve element may be floated and moved by the flow of fluid, in cooperation with the camming action of the sloping ceiling surface 50, toward the niche defined by the wall 54 and surface 58 into register with the outlet 29, as shown in full lines, permitting fluid flow through the unstructed outlet 28.

It is evident that the same sequence of operations will take place in a construction having more than two outlets and more than one ball valve element.

While the walls 36 and 38 are shown as being disposed vertically, it is evident that they may have a slight inclination and yet operate in the same manner as stops.

FIG. 5 illustrates a modification in which the outlets are disposed in line along a substantially straight section of a flow passage, and which arrangement utilizes a ball valve element having a density equal to or slightly less than that of the fluid being controlled.

The sequencing valve 128 is rectangular in cross section and comprises a base 130 and a cover 132 providing a substantially straight section 134 of an endless fluid flow passage. The base 130 includes an elongated return passage 136 having U-bends 133 and 135 at opposite ends connecting with opposite ends of the section 134. The section 134, U-bends 133 and 135, and the connected return passage 136 form an endless flow passage, to which fluid under pressure is admitted by an inlet 138 in one end of the return passage 136 directing incoming fluid axially of the reutrn passage. A side wall of the section 134 of the flow passage includes a series of spaced outlets $140^1$, $140^2$ and $140^3$ which are sequentially opened for the discharge of fluid.

A plurality of ball valve elements 142 are freely movable in the endless flow passage comprising the section 134, the return passage 136 and the U-bends 133 and 135. Since at least one outlet 140 is to be unobstructed while the sequencing valve is in operation, the number of valve elements should be at least one less than the number of outlets. In the arrangement illustrated in FIG. 5, where three outlets are provided, two ball valve elements move freely within the flow passage to be moved into position to obstruct flow through two outlets while permitting flow through the unobstructed third outlet.

The bottom wall of the return passage 136 contains a bleed port 144 controlled by a normally open check valve 146. The inner end of the bleed port is covered with a screen 148 to permit free travel of the ball valve element 142 through the return passage 136. As shown, the bleed port 144 discharges into the ambient air, but it is evident that a conduit may lead the discharged bleed fluid into one of the distribution lines connected with the outlets.

The bottom wall or floor of the section 134 of the flow passage is contoured to form a series of sloping floor surfaces or inclines 150, 151 and 152, all inclines in the same direction, which are interconnected by a pair of substantially vertical walls 154 and 156 and by a pair of connecting floor surfaces 158 and 160. There should be as many sloping floor surfaces as there are outlets, and the surfaces are so disposed that the highest points are offset relative to the outlets to assure sequential opening of the outlets. Apertures 161 in the connecting floor surfaces 158 and 160 permit the flow of fluid between the passages 134 and 136.

The upper wall or ceiling of the flow passage 134 is contoured to form a pair of sloping ceiling surfaces 162 and 164 inclined in the same direction. The upper end of the surface 162 is connected with the lower end of the surface 164 by a connecting ceiling surface 172 and by a substantially vertical wall 166, forming a niche in which the outlet $140^2$ is disposed. The lower end of the surface 162 is connected by a substantially vertical wall 170 with a flat ceiling surface 176 defining a niche in which the outlet $140^3$ is located. The upper end of the ceiling surface 164 is connected by a connecting ceiling surface 174 and a substantially vertical wall 168 with a flat ceiling surface 169 forming a part of the U-bend 133, providing a niche in which the outlet $140^1$ is located.

FIG. 5 illustrates the parts in one of their operative positions, in which the two ball valve elements 142, shown in solid lines, obstruct the flow of fluid through the outlets $140^1$ and $140^2$, while fluid is discharged through the unobstructed outlet $140^3$. A portion of the fluid under pressure, admitted through the inlet 138, passes toward the right through the return passage 136, upward through the right hand U-bend 135 and through the outlet $140^3$. Another portion of the incoming fluid passes upwardly through the apertures 161, through the section 134 of the flow passage and through the outlet $140^3$. The pressure of the fluid within the flow passage retains the valve elements 142 on their respective outlets and also retains the normally open check valve 146 on its seat to prevent the flow of fluid through the bleed port 144.

When the flow of fluid through the flow passage is terminated, as by closing a valve in the supply line or by deenergizing the supply pump, the pressure within the endless fluid flow passage quickly drops permitting the check valve 146 to open to bleed fluid from the section 134 and return passage 136. As the liquid level within the section 134 recedes, the two ball valve elements, under the force of gravity, move from register with the outlets $140^1$ and $140^2$. If the ball valve elements have a density less than that of the fluid in the flow passage, they will float on the surface of the fluid, and if the density of the ball valve element is the same as the density of the fluid, the valve elements will remain suspended within the fluid. As the level continues to recede, the two ball valve elements contact the sloping floor surfaces 151 and 152, respectively, and roll or are cammed toward the left, one ball valve element coming to rest on the connecting floor surface 160 in contact with the vertical wall 156, and the other ball valve element coming to rest within the return passage 136, as shown in broken lines. In this operation the return passage 136 functions in the same manner as the niches between adjoining inclines.

If the return passage 136 is inclined toward the right, the ball valve element will continue to roll down the incline to the right hand end. The return passage has a cross section greater than the cross section of the ball valve element permitting unrestricted rolling or movement of the valve element through the return passage.

When the fluid supply is resumed, the incoming fluid through the inlet 138 will split. One portion, travelling through the return passage 136, will sweep along with it the ball valve element 142, carrying the ball valve element through the right hand U-bend 135 and upward into register with the outlet $140^3$ to obstruct flow therefrom, while some of this portion will continue toward the outlets $140^2$ and $140^1$. In this construction and operation, the upper end of the U-bend 135 serves the same purpose as the two sloping ceiling surfaces 162 and 164. Another portion of the fluid entering at 138 will flow upwardly through the U-bend 133 toward the three outlets. The portions entering from the opposite ends of the section 134 of the flow passage quickly raise the level therein. Fluid also enters the section 134 through the apertures 161, jetting the valve element 142 upwardly. If the valve elements have a density slightly less than that of the fluid, they will float on the fluid. In such a construction the apertures 161 may be omitted, if desired, and fluid can be supplied to the section 134 through the U-bend 135 or through both U-bends 133 and 135. If the valve elements have a density equal to that of the fluid being controlled, they will be suspended in the fluid and will be carried with the fluid toward the outlets. Jets of fluid entering the section 134 through the apertures 161 will assure that the ball valve elements resting within the niches will be lifted from these niches and carried toward the outlets. The ball valve element 142, in contact with the vertical wall 156, will rise until it meets the sloping ceiling surface 164 which, in cooperation with the fluid flow, will cam the ball valve element toward and into register with the outlet $140^1$ to obstruct flow therefrom. Fluid discharges from the unobstructed outlet $140^2$. When the supply of fluid is again discontinued, the fluid pressure drops, check valve 146 opens, and the liquid level recedes in section 134. The valve element 142 in register with the outlet $140^1$ drops and rolls or is cammed down the incline or surface 152 to the dotted line position adjacent the inlet 138, while the ball valve element 142 in register with the outlet $140^3$ drops and rolls or is cammed down the surface 150 to the surface 158 at the foot thereof into contact with the vertical wall 154. When fluid flow is resumed, the ball valve element 142 adjacent the inlet 138 is carried and/or floated into register with the outlet $140^3$ and the ball valve element 142 at the foot of the surface 150 is carried and/or floated, in cooperation with the camming action of the sloping ceiling surface 162, and directed toward and into register with the outlet 140², whereby the outlets 140² and 140³ will be obstructed, while fluid is discharged through the unobstructed outlet 140¹. Similarly, in an obvious manner, when the fluid supply is again interrupted and initiated, the ball valve elements 142 will obstruct flow through the outlets 140¹ and 140², permitting the discharge of fluid through unobstructed outlet 140³.

It is evident, with reference to the modification illustrated in FIG. 5, that the return passage 136 need not be straight, as shown, but may be curved, and that the return passage need not underlie the section 134 but may be disposed to one side thereof, just so that the bottom wall of the return passage 136 should not be at a higher elevation than the bottom of the inclined surfaces in the bottom wall of the section 134.

It should be noted, from an inspection of the modification shown in FIG. 5, that the U-bend 133 and return passage 136 constitute, in effect, wall surfaces providing a niche interconnecting the low point of a bottom wall inclined surface with the adjoining high point of an inclined surface in the bottom wall at opposite ends of the elongated section 134, and that the U-bend 135 constitutes, in effect, an inclined ceiling surface.

While not limited thereto, this invention finds particular application in portable irrigation systems for orchards. For example, in the citrus belt in the State of Florida, it is common practice to assemble an irrigation system on the ground, with branches having irrigation heads between the rows of trees. During occasional freezing periods, it is necessary to heat the trees to prevent damage to the fruit, and for this purpose oil burning heaters are frequently employed. In view of the fact that all of the outlets of my novel sequencing valve are normally open when there is no flow of fluid through the valve housing, it is evident that my sequencing valve can be used as a manifold to supply a light fuel oil to heaters which may be connected with all of the branches of the irrigation system. In freezing weather, the irrigation heads may be replaced by fuel oil heaters, and fuel oil, instead of water, may be pumped through the system. As the density of the fuel oil is considerably less than the density of water, the ball valve elements, which are designed to float on water or to be suspended therein, will sink in fuel oil. Since the rate of flow of fuel oil through the system to the burners will be only a small fraction of the rate of flow of water to the irrigation heads, such rate of flow of fuel oil will be too low to carry the ball valve elements to their valve closing positions. As a consequence, fuel oil will be simultaneously discharged through all of the outlets and into all of the branch lines and to the burners connected therewith, whereby the sequencing valve will function in the manner of a manifold.

While, in the above descriptions of operation, it was assumed that the sequencing valves were used in conjunction with an irrigation system, it is evident that the invention has wider application, and can be used wherever a definite sequencing operation of a fluid is desired, such as, for example, in oil fields, to deliver oil from a tank to a number of tank cars, or in water or sewage aeration systems.

It may be noted, in the several modifications disclosed, that there is provided an endless flow passage through which the fluid flows under pressure, and that this passage includes two or more outlets through which the fluid may be sequentially discharged. Sloping upper and lower surfaces are provided, which are inclined to advance each ball valve element in a single direction in sequence from one outlet to the next outlet. The number of ball valve elements required depends upon the number of outlets to be controlled and on the number of outlets to be left unobstructed. The number of ball valve elements must be at least one less than the number of outlets. If only one outlet is to be left unobstructed, the number of ball valve elements must be one less; if two outlets are to be left unobstructed, the number of valve elements must be two less, and so on. The upper walls are interconnected to form niches, there being an outlet in each niche. The upper walls are contoured so that the ball valve elements, which may either float on the liquid or be suspended therein, are cammed toward the next succeeding outlet to register therewith and to be retained in position by fluid pressure. When the supply of fluid is discontinued, gravity causes the ball valve elements to drop from register with the outlet when the pressure decreases. Bleed ports permit the drainage of fluid when the pressure drops. The lower wall surfaces are inclined to permit the ball valve elements to roll or to be cammed, under the force of gravity, down their slopes to a position at rest at the foot of the incline and in proximity with the next succeeding outlet so that, when fluid flow is resumed, the valve elements are floated and/or carried by the stream, and are cammed, by the upper sloping wall surfaces, toward the outlets. The sloping surfaces of the bottom walls are inclined in a direction opposite with reference to the sloping surfaces in the upper walls, and the high and low points of the bottom walls are offset axially of the flow passage relative to the high and low points of the upper sloping wall surfaces to advance the ball valve elements in a single direction through the flow passage in response to the alternate cessation and initiation of fluid flow through the sequencing valve.

Having fully described my invention, it is to be understood that I do not wish to be limited to the details set forth herein but that various changes may be made in the details and proportions without departing from the principles of the invention or from the scope of the annexed claims.

I claim:

1. A sequencing valve, comprising: a housing having upper, lower and side walls defining an endless flow passage; fluid inlet means into said flow passage; a plurality of outlets in the upper part of said flow passage; ball valve means, at least one less than the number of outlets, freely movable in said flow passage, said ball valve means having a density not greater than the density of the fluid to be controlled; the upper and lower walls of said flow passage each having a series of inclined surfaces, wall means interconnecting the high point of an inclined surface with the low point of an adjoining inclined surface, said fluid outlets being positioned adjacent the high points in the upper wall, said interconnecting wall means in the upper wall being offset, axially of said endless flow passage, relative to the interconnecting wall means in the lower wall, the inclined surfaces in the upper wall sloping in an opposite direction in relation to the inclined surfaces in the lower wall; and bleed means of restricted cross section relative to said outlets in the lower part of said flow passage, whereby, upon initiation of fluid flow through said inlet means, said ball valve means will float on or be carried upwardly by the fluid into engagement with an upper inclined surface to be cammed into position to close an outlet to prevent flow therethrough, and when flow through said inlet means is discontinued, the fluid remaining within the flow passage escapes through the bleed means and the ball valve means engages an inclined surface on the lower wall to be cammed down the slope thereof to come to rest on the interconnecting wall means, so that when fluid flow is again initiated, each ball valve means will again be floated or carried upwardly against an inclined surface on the upper wall to be cammed to an adjacent outlet at the upper end thereof in a manner previously described, each ball valve means progressing in a single direction through said flow passage.

2. A sequencing valve as defined in claim 1, in which each of said interconnecting wall means defines a niche:

3. A sequencing valve as defined in claim 1, in which said fluid inlet means are positioned adjacent the low points in the lower wall.

4. A sequencing valve as defined in claim 1, in which said fluid inlet means include upwardly directed apertures adjacent the low points in the lower wall.

5. A sequencing valve as defined in claim 1, in which said side walls include an inner wall and an outer wall, and in which said inlet means are positioned in said inner wall and said outlets are positioned in said outer wall.

6. A sequencing valve as defined in claim 1, in which said bleed means comprises a normally open check valve.

7. A sequencing valve as defined in claim 1, in which said flow passage is annular in form.

8. A sequencing valve as defined in claim 1, in which said endless flow passage comprises an elongated section having said inclined surfaces in the upper and lower walls thereof, and a return passage interconnecting opposite ends of said elongated section.

9. A sequencing valve as defined in claim 8, in which said bleed means is disposed in said return passage.

10. A sequencing valve as defined in claim 8, in which said fluid inlet means includes an inlet connected with said return passage.

11. A sequencing valve as defined in claim 8, in which said fluid inlet means includes an inlet connected with one end of said return passage and directed to discharge fluid axially thereof.

12. A sequencing valve as defined in claim 8, in which said return passage underlies said elongated section.

No references cited.

ISADOR WEIL, *Primary Examiner.*